United States Patent Office 3,256,443
Patented June 14, 1966

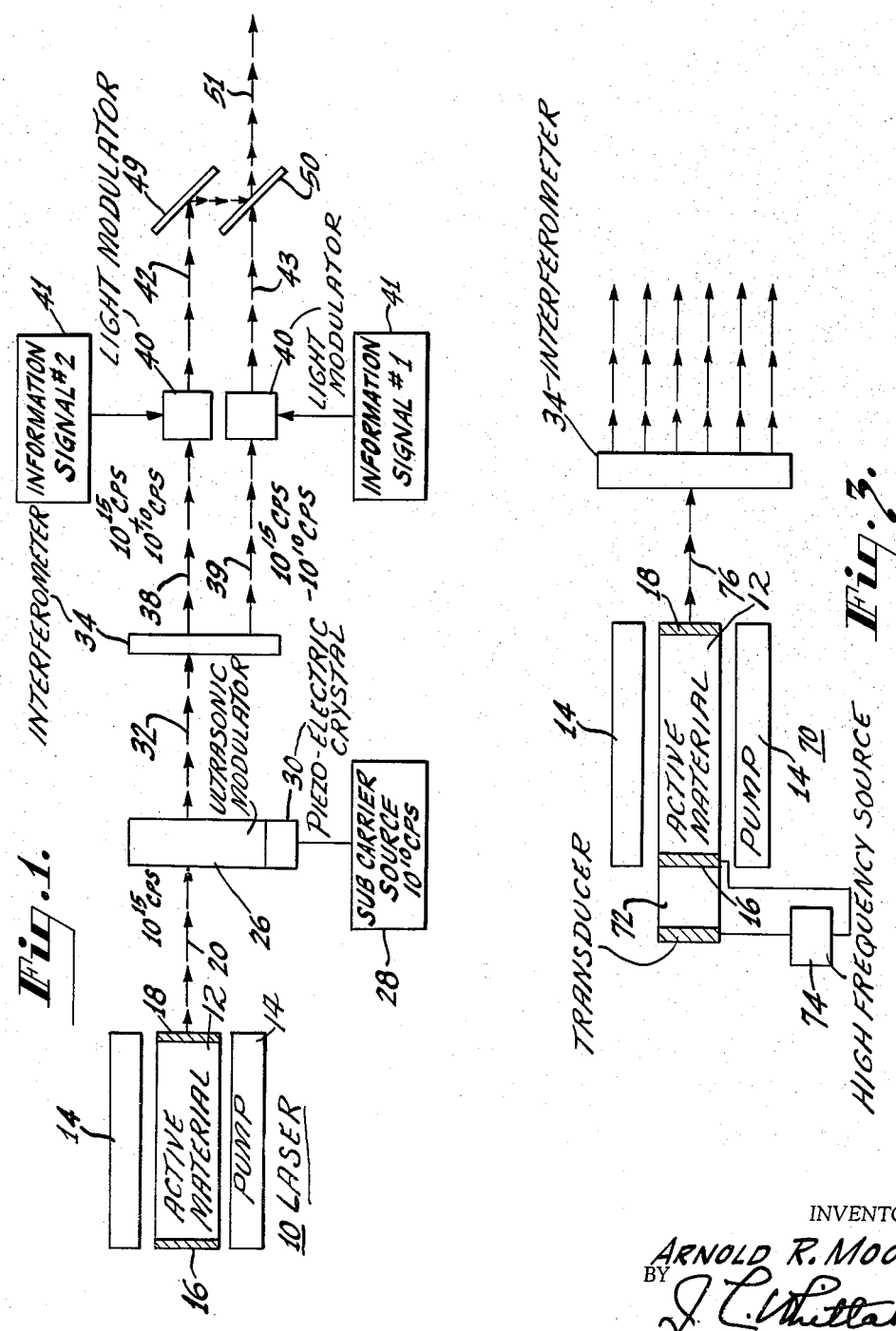

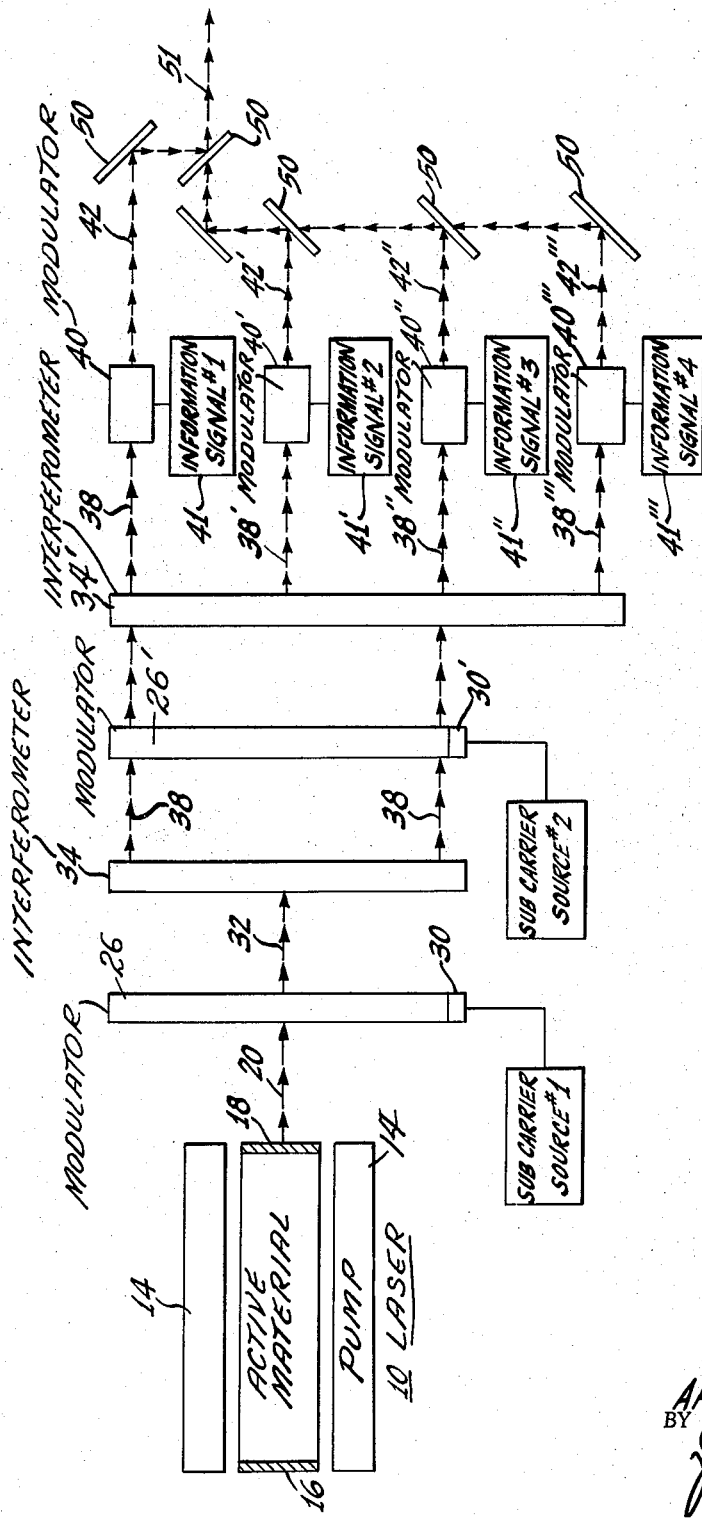

3,256,443
LASER MULTIPLEX COMMUNICATION SYSTEM
Arnold R. Moore, Princeton, N.J., assignor to Radio Corporation of America, a corporation of Delaware
Filed Nov. 27, 1962, Ser. No. 240,240
6 Claims. (Cl. 250—199)

This invention relates to improved optical masers or lasers. In particular, this invention relates to an improved laser communication apparatus or system.

The term laser is used to refer to a device which provides "light amplification by stimulated emission of radiation." The laser device is, at the present, most commonly used as a source of coherent light.

In general, a laser includes an active material, or substance, that will produce radiation, an excitation source that pumps power into the active material, and a resonant structure or resonant cavity tuned to the radiation frequency.

The active material is a material having at least two, and preferably three or four, energy levels, or atomic states, which are separated in energy by an amount corresponding to a characteristic output frequency.

The active material is characterized by the properties of (1) its atomic particles can be excited into the higher of two energy levels and an inverted population condition may be produced and (2) when the atomic particles return to the lower energy level, the active material emits electromagnetic radiations, i.e., light. The emitted light is such that, within the active lasing material, an incident photon triggers an ion to emit a photon in phase with the resonance of the cavity. Thus, substantially all of the emitted light is substantially in phase and is described as coherent light.

The excitation source, or pumping source, is a source of energy which is positioned adjacent to the active material and which is used to excite the ions in the active material into a higher energy level. The pumping source may comprise a radio frequency field, a light source, e.g. a xenon flash tube, or other known types of energy sources.

The resonant structure, or resonant cavity, normally includes two light reflective surfaces, such as mirrors, positioned at the ends of the active material. At least a portion of one of the light reflective surfaces normally is partially transparent so that output light may be obtained from the laser through this partially transparent surface. The light reflective surfaces are precisely oriented so that at least one resonant mode exists between the mirrors at frequencies for which the spacing between mirrors corresponds to a path length of an integral number of half wavelengths.

More detailed description of laser structures, operation and theory is given by Vogel et al. in Electronics, October 27, 1961, found on pages 40–47, and by Boyd et al., in Physical Review Letters, 8, April 1, 1962, pages 269–272.

The known laser devices, briefly described above, provide a beam of coherent electromagnetic radiation. The beam of coherent electromagnetic radiation is usually in the infrared or the visible light spectrum. The beam of coherent light is substantially of a single high frequency, e.g., about $10^{15}$ c.p.s. Usually the beam of coherent light includes several other frequencies which are closely spaced from the principal frequency. The closely spaced frequencies are produced due to other undesired modes, or oscillations, that occur in the resonant cavity and which cannot be removed by tuning the presently known structures.

Due to the fact that the coherent light beam from a laser is at a relatively high frequency, the bandwidth that is available for communicating information is extremely wide. Thus, it is desirable to utilize this wide bandwith to communicate many simultaneous messages. To communicate a large number of messages it is necessary to wideband-modulate the laser beam. The obvious approach to the problem of modulation is to place a shutter in front of the coherent light beam and to modulate the light intensity of the beam with all frequencies up to the maximum bandwidth desired. The difficulty with this proposed solution is that of building a light modulator which will operate over a useful range of frequencies wherein the upper frequency must be at least in the kilomegacycle region in order to utilize the available bandwidth of a $10^{15}$ c.p.s. carrier frequency.

It is therefore an object of this invention to provide a novel laser communication apparatus.

It is a further object of this invention to provide a novel laser transmitting device which is capable of simultaneously transmitting a multiplicity of messages by means of coherent light.

It is a still further object of this invention to provide a novel laser transmitting device which is capable of simultaneously transmitting a plurality of messages and in which undesired resonant modes in the resonant cavity may be attenuated or substantially suppressed.

These and other objects are accomplished in accordance with this invention by providing a laser which produces a beam of coherent light of a predetermined carrier frequency. The beam of coherent light is modulated by at least one modulating frequency which produces at last two light side bands which are separated in frequency by twice the modulation frequency. The modulation of the beam may be done by means such as an electrooptic unit external the laser cavity or by producing an ultrasonic wave in the laser cavity. The side bands, produced by the modulation, are then spatially separated from each other, and from the carrier frequency, by means such as a prism or an interferometer. The spatially separated side bands are then each modulated with different information signals. The signal information modulation may be done, for example, by separate electrooptic units since the side bands are separated in space. The information modulated side bands may be individually transmitted or they may be recombined with the carrier frequency, so that a single light conducting means may be utilized to transmit a multiplicity of messages. In the latter situation, at the receiver, the information modulated side bands are again spatially separated from the carrier frequency, e.g. by means of another interferometer or prism, and are then detected and utilized. In one embodiment of the invention, the laser beam is modulated with a single modulating signal, which produces a pair of side bands, before the spatial separating means. In a second embodiment the laser beam is modulated with a plurality of carrier signals, which produces a plurality of sidebands, before the spatial separating means. In still another embodiment, the laser beam and the modulating signal are propagated in a number, which may be the laser cavity, in substantially the same direction which, by the Doppler effect, produces a plurality of side bands, before the spatial separating means.

The invention will be described in greater detail by reference to the accompanying drawings wherein:

FIG. 1 is a partially schematic view of a first embodiment of a laser transmitting system in accordance with this invention;

FIG. 2 is a schematic illustration of a second embodiment of this invention; and, FIG. 3 is a partially schematic view of a portion of a third embodiment of this invention.

Similar reference characters are applied to similar elements throughout the drawings.

FIG. 1 shows an apparatus 10 for producing coherent radiation. When the coherent radiation is in the light spectral range, the device 10 is known as a laser. The laser 10 generally comprises an active material 12, a pumping source 14, and a pair of optical reflecting surfaces 16 and 18 which define the opposite ends of a resonant body or resonant cavity.

The active material 12 may comprise any known substance which has at least two, and preferably three or four, atomic states or energy levels separated by an amount corresponding to a characteristic frequency of the active material 12. The active material 12 has the property of being excitable into an inverted population density condition, i.e. an excess population can be established in the upper, or one of the upper, energy states. The active material 12 emits substantially coherent radiation as the atomic particles return from the higher energy level to a lower energy level. A specific example of an active material 12 is calcium fluoride dopped with divalent samarium.

The pumping source 14 may comprise any source of energy which is capable of exciting the molecules or ions in the active material 12 from a lower energy level into one of the desired higher energy levels. The pumping source 14 is a source of radiation which is capable of establishing the inverted population density condition in the active material 12. Examples of such pumping sources are a means for providing a radio frequency field, a xenon flash tube, or other suitable known types of energy sources.

The active material 12 is positioned in a resonant cavity. Thus, adjacent to the ends of the active lasing material 12 are two light reflecting devices or mirrors 16 and 18. One of the mirrors, e.g., light reflecting device 18, is made so that a portion thereof is at least partially transparent so that an output coherent light beam may be obtained from the laser 10. The light reflecting device may be formed of a highly light reflecting material, such as silver, or of a multiple layer structure such as an interference type light reflector.

In operation of the device 10 shown in FIG. 1, the pumping source 14 energizes the active material 12 to establish the inverted population condition. As the atomic particles return to a lower energy level, an oscillating coherent light is produced within the resonant cavity. The light may be visible or invisible such as, for example, infrared. The light produced by the device 10 is predominantly of one frequency, e.g., $10^{15}$ c.p.s. However, the presently available laser devices 10 normally produce a predominate frequency with one or more other frequencies or "undesired modes," closely spaced adjacent the predominant frequency. The resolving capabilities of the known interferometers is such that the "undesired modes" cannot be spatially separated, otherwise these modes could be used as sidebands. The reason that closely spaced frequencies are produced is that the resonant cavity cannot be tuned accurately enough to eliminate the oscillating undesired modes of the closely adjacent frequencies. At least some of the undesired modes may be eliminated from the embodiment of this invention shown in FIG. 3, as will be explained. In order to modulate the coherent light beam 20 from the laser device 10, and in order to transmit a multiplicity of messages simultaneously, sideband frequencies are generated from the light beam or carrier frequency 20. To do this, the carrier frequency 20 is passed through a modulating device 26 which modulates the $10^{15}$ c.p.s. carrier frequency 20 by a sideband frequency, i.e., $10^{10}$ c.p.s. The sideband frequency may be produced by any known source 28. In this embodiment, the modulating device 26 is a device which provides optical shuttering by ultrasonic modulation of the refractive index of a suitable solid or liquid. A piezo-electric crystal 30 is mechanically vibrated at the frequency of the sideband source 28. Vibrations produced by motion of the piezo-electric crystal 30 produce mechanical compressional waves of high frequency in a liquid or solid positioned in the device 26. The device 26 may contain water, heptane or butyl bromide. Due to the mechanical vibrations of the piezo-electric crystal 30, supersonic waves are set up in vibrating material in the device 26. The supersonic waves travel through the transparent vibrating medium in a direction normal to the laser beam 20 and act in the manner of a diffraction grating to the coherent laser beam 20. Thus the compressional regions and the rarefied regions of each supersonic wave vary the index of refraction of the medium 26 as the laser beam 20 passes therethrough. Hence, interference results between the supersonic waves provided by the subcarrier source 28, and the laser light beam 20, which diffracts the laser light beam 20. The frequency of this diffraction will be the same as that of the subcarrier source 28, i.e., $10^{10}$ c.p.s. in the example given. The supersonic wave, in this embodiment, is propagated in a direction normal to the laser beam 20 so that only two sideband frequencies are generated. Other methods may be employed to modulate the beam 20. For example, an electro-optic device such as a Kerr cell may be employed.

Emerging from the modulating device 26 is a coherent light beam 32 which includes two different components or "sidebands" which are spaced apart by twice the modulation frequency centered around the carrier frequency, i.e., $10^{15}+10^{10}$ and $10^{15}-10^{10}$. The two sideband light beams are superimposed as a coherent light beam 32 having the two sideband frequencies and the carrier band frequency.

The light beam 32 is then passed through a suitable device 34 to separate, in space, the two sidebands 38 and 39. One such device is a Fabry-Perot interferometer 34. Another device of this type is a prism (not shown). The interferometer separates the components of the beam so that the sideband frequency 38 will be separated in space, as well as in frequency, from the sideband frequency 39. Once the two sidebands 38 and 39 are separated in space, both of the sideband frequencies can be modulated with different information signals. The information signal modulation may be done on each sideband by any conventional light modulators 40. The light modulators 40 may be any known electro-optic modulator such as Kerr cell, or other known light modulating device. Information signals are supplied by any known means 41 to each of the light modulators 40. The signal information may be any type of information such as telephone conversation or video information for television.

The first information-modulated sideband light beam 42 is then recombined with the second information-modulated sideband beam 43 by any conventional optics such, for example, as mirrors 49 and 50. The result is a coherent light beam 51 which includes two information-modulated signals which may be transmitted over a single light conducting medium. If desired, the original light carrier of $10^{15}$ c.p.s. may also be transmitted.

Thus, in accordance with this invention the available bandwidth of a laser beam is efficiently utilized with known light modulating devices by separating the laser beam into at least two sideband frequencies, spatially separating the sidebands, applying different signal modulating signals to each of the two sidebands and recombining in space the now modulated sidebands so that the information may be transmitted over a single light communication medium.

FIG. 2 shows an embodiment of this invention wherein more than two sideband frequencies are produced and are separated in space so that each may be modulated by a different information signal. In this embodiment, an unmodulated carrier beam 20 is passed through a first modulating device 26 which produces two different "sidebands" or frequency components. The sidebands are then spatially separated by being passed through a first interferometer 34. The spatially separated sidebands 38 are then passed through a second modulating device 26' which produces two more sideband frequencies on each of the now spatially separated sidebands 38. Both pairs of these latter two sideband frequencies are also spatially separated by passing them through a second interferometer 34'. Thus, four spaced light beams 38, 38', 38'' and 38''' are provided. The process may be repeated any desired number of times to provide any desired number of spatially separated light beams. The sideband frequencies of the modulating devices 26 . . . $26^n$ preferably differ from each other by at least $10^{10}$ c.p.s. The now separate light sidebands 38 . . . $38^n$ may be individually modulated by separate signal information sources 41 . . . $41^n$ and separate light modulator devices 40 . . . $40^n$. These devices may be similar to those previously described. When desired, all of the signal modulated spaced apart beams 42 . . . $42^n$ may be combined by conventional optics, e.g., mirrors 50, to be transmitted as one light beam 51.

FIG. 3 shows an embodiment of this invention wherein a plurality of sidebands are produced within the laser cavity. The device 70 is similar to the device 26 previously described except that a coaxial ultrasonic standing wave is produced within the laser cavity along with the oscillating light wave. This arrangement generates a set of sidebands on both sides of the carrier frequency, each spaced one acoustic frequency apart. The device 70 may comprise an active material 12 positioned in a resonant cavity formed by light reflecting surfaces 16 and 18. Positioned on the light reflecting surface 16 is a transducer 72 which may be, for example a quartz crystal. The transducer 72 is connected to a sideband generator 74.

During operation of the device 70, the inverted population condition is established in the active material 12 by means of the pumping source 14. Also in the resonant cavity there is a standing ultrasonic wave developed by means of the transducer 72. The transducer 72 vibrates at the frequency of the source 74 which moves the light reflecting surface 16. The movement of the light reflecting surface 16 produces a standing wave in the cavity which may be of a frequency of $10^{10}$ for example. Thus, within the resonant cavity there is an oscillating light of a frequency of $10^{15}$ c.p.s. and a standing supersonic wave at a frequency of $10^{10}$. Both the oscillating light and the standing wave, are propagated in substantially the same direction. Each of the nodal points of the standing ultrasonic wave provides a change in the index of refraction of the active material, i.e., reflection, with respect to the oscillating light. Each reflection area, i.e., each nodal point, slightly reflects the oscillating light. The reflection of the oscillating light from each nodal point is small. However, due to the fact that there are many nodal points, and the reflection from each nodal point is in phase, a plurality of frequencies, or sidebands are produced in the output light 76 from the laser.

During operation of the device 70, the frequency of the ultrasonic wave is adjusted so as to resonate the ultrasonic wave in the cavity while the oscillating light is resonating. This feature eliminates undesired light oscillating modes in the light output, since these undesired modes are not tuned to the resonant ultrasonic wave. So that the nodal point reflections, for the undesired modes, are out of phase thus providing coherent light output beam 76 having substantially reduced undesired modes. It should be understood that the "undesired modes" are so closely spaced that the resolving capabilities of the known interferometer cannot spatially separate the modes.

In the alternative a coherent light beam may be directed through a material having a standing ultrasonic wave, remote from the laser cavity. When this is done and both the laser beam and the ultrasonic wave are propagated in substantially the same direction, the multiple sidebands will be produced. However, in this latter embodiment, the undesired modes cannot be eliminated from the cavity by tuning the ultrasonic wave. Therefore, the embodiment shown in FIG. 3 is preferred.

When the multiplicity of sidebands are obtained in the beam 76, the bands are separated in space, for example by an interferometer 34, and are then modulated by the information signals as has been explained. The information modulated subcarriers are then recombined, when desired, with the carrier to be transmitted to a remote station for receiving the multiplicity of light information signals.

The light in any stage of this device, is a coherent light beam and the change provided by the modulating devices, or the interferometer device, is to modulate the light frequency or the spacing between frequencies.

The information modulated sidebands need not be recombined unless it is desired to send all of the information over a single light conduction medium. For example, if a single light conduit is provided to a remotely positioned point, it would be desirable to combine all of the different information containing frequencies so that they may all be simultaneously sent through the same conduit.

The receiving end of the above described laser system may use an interferometer type device to separate the different signal modulated subcarrier frequencies, which will then be separately detected by conventional means, such as photocells, activated by each of the separate channels.

What is claimed is:

1. In combination,
 (a) means for producing a light beam having a plurality of components of different frequencies,
 (b) means for spatially separating according to frequency said frequency components,
 (c) means for modulating at least two of said separated components, and
 (d) means for spatially combining the modulated components.

2. In combination,
 (a) means for producing a beam of light at a first frequency,
 (b) means positioned in the path of said beam of light for producing sideband frequency components of different frequencies in said beam of light,
 (c) means for spatially separating the sideband frequency components, and
 (d) means for modulating at least two of said separated components.

3. In combination,
 (a) means for producing a beam of light at a first frequency,
 (b) means positioned in the path of said beam of light for producing sideband frequency components of different frequencies in said beam of light,
 (c) means for spatially separating the sideband frequency components, and
 (d) means for modulating at least two of said separated components, and
 (e) means for spatially combining the modulated components.

4. In combination,
 (a) means for producing a beam of coherent light at a first frequency,
 (b) means having a variable index of refraction positioned in the path of said beam of light,
 (c) means for varying the index of refraction of said second mentioned means whereby the light beam emerging from said second mentioned means includes components of different frequencies,
 (d) means positioned in the path of said beam emerging from said second mentioned means for spatially separating according to frequency the frequency components of said beam,
 (e) means for modulating at least two of said separated components, and
 (f) means for spatially combining said separated components.

5. In combination,
(a) a laser including an active material contained within a resonant cavity for producing a beam of coherent radiation,
(b) means for producing a standing ultrasonic wave in said active materials, said ultrasonic wave having a frequency lower than the frequency of said beam whereby the optical energy generated by said laser occurs at a plurality of frequencies determined in part by said ultrasonic wave whereby said laser produces said beam having components of different frequencies,
(c) means for spatially separating the frequency components of the beam produced by said laser,
(d) means for modulating at least two of said separated components, and
(e) means for spatially combining the modulated component beams.

6. In combination,
(a) means for producing a beam of light at a first frequency,
(b) a plurality of means each having a variable index of refraction the first of said means being positioned in the path of said beam of light,
(c) means for varying the index of refraction of each of said plurality of means,
(d) a plurality of means for spatially separating the frequency components of a light beam,
(e) different ones of said second mentioned plurality of means being positioned to spatially separate the frequency components of light beams emerging from different ones of said first mentioned plurality of means,
(f) each of said first mentioned plurality of means except the first being positioned in the path of the light beams emerging from a respective one of said second mentioned plurality of means,
(g) means for modulating the spatially separated frequency components emerging from the last of said second mentioned plurality of means, and
(h) means for spatially combining the modulated components.

References Cited by the Examiner

UNITED STATES PATENTS

| | | |
|---|---|---|
| 2,017,886 | 10/1935 | Barden et al. _____ 179—15 |
| 2,385,086 | 9/1945 | D'Agostino et al. |
| 2,707,749 | 5/1955 | Mueller _____ 250—199 |
| 3,166,673 | 1/1965 | Vickery et al. _____ 250—199 |

FOREIGN PATENTS

| | | |
|---|---|---|
| 608,711 | 3/1962 | Belgium. |
| 530,777 | 12/1940 | Great Britain. |
| 736,790 | 9/1955 | Great Britain. |

OTHER REFERENCES

Barnes, Proc. I.R.E., July 1962, pp. 1686, 1687.

Vogel et al., Electronics, vol. 34, Nov. 10, 1961, pp. 81–85.

Dulberger et al., Electronics, Nov. 3, 1961, pp. 40–44.

De Maria et al., Proc. I.R.E., vol. 50, No. 6, June 1962, p. 1522.

DAVID G. REDINBAUGH, *Primary Examiner.*

J. W. CALDWELL, *Assistant Examiner.*